United States Patent [19]

Fletcher et al.

[11] 4,078,290

[45] Mar. 14, 1978

[54] STATOR ROTOR TOOLS

[76] Inventors: James C. Fletcher, Administrator of the National Aeronautics and Space Administration, with respect to an invention of Donald D. Diamond, Bacliff, Tex.

[21] Appl. No.: 739,915

[22] Filed: Nov. 8, 1976

[51] Int. Cl.² .............................................. B23P 19/04
[52] U.S. Cl. ........................................ 29/252; 29/244; 29/23.5; 29/156.8 R
[58] Field of Search .................. 29/156.8 R, 427, 239, 29/240, 244, 267, 275, 283, 252, 23.5

[56] References Cited

U.S. PATENT DOCUMENTS

| 930,735 | 8/1909 | Dahl | 29/23.5 |
|---|---|---|---|
| 1,172,334 | 2/1916 | Williamson | 29/23.5 |
| 1,172,335 | 2/1916 | Williamson | 29/23.5 |
| 1,269,144 | 6/1918 | Williamson | 29/156.8 R |
| 2,912,222 | 11/1959 | Wilkes, Jr. | 29/156.8 R |
| 3,673,668 | 7/1972 | Crook | 29/254 |

FOREIGN PATENT DOCUMENTS

| 1,104,875 | 4/1961 | Germany | 29/267 |

*Primary Examiner*—C.W. Lanham
*Assistant Examiner*—Daniel C. Crane
*Attorney, Agent, or Firm*—Edward K. Fein; John R. Manning; Marvin F. Matthews

[57] ABSTRACT

An apparatus and method for removing and reinserting base member segments in an arcuate slot in an engine part where each base member separately includes blades or stators comprising holding the engine part in place while manipulating fingers on an arm into an interfitting abutting relationship with most of the blades on a base member and applying a torque force to the base of the blades to move a base member relative to such arcuate slot.

6 Claims, 4 Drawing Figures

STATOR ROTOR TOOLS

ORIGIN OF THE INVENTION

The invention described herein was made by an employee of the U.S. Government and may be manufactured and used by or for the Government of the United States of America for governmental purposes without the payment of any royalties thereon or therefor.

FIELD OF THE INVENTION

This invention relates to a method and apparatus pertinent to repair of jet engines and more particularly for installation and removal of stator blades from engine cases.

BACKGROUND OF THE INVENTION

Certain jet engines, compressors and turbines employ central rotatable rotors within outer cases which respectively carry "stators". The stators are simply blade members which are circumferentially disposed and equidistantly spaced from one another about a rotor and an outer case. The rotor rotates within the case so that the stators produce or generate a flow of air for operation of the engine. Symmetry is a significant factor in any design and operation of an engine. Typically, an engine is made in matching or mirror arrayed components with respect to a lengthwise extending plane which also contains the central axis of rotation. Thus, each one-half component of an engine case or rotor is semi-cylindrical about a central axis. Along the length of each component and spaced from one another are successive rows of blades where each row contains the circumferentially spaced stators.

In each row of blades, the stators or blade segments are invertedly "T" shaped where the base of the inverted "T" is attached to an arcuately shaped base member. Thus, each row of stators is comprised of a number of segments which respectively carry the individual blade segments which project radially from a segment. Typically, the arcuate configuration of a segment matches the curvature of the case or rotor. The case or rotor is provided with a slotted channel in its circumference and which receives the side edges of a segment so that the fin portion of a blade element extends through the opening of the slotted channel.

Heretofor, removal of the segments was accomplished by mechanically driving the members with a hammer and driving tool or any other available driving instrument. If the base members are seized in place their damage invariably results in removal of the segments. For these reasons the cost of replacement of segments is an expensive and time consuming process. In the past, driving tools have caused irrepairable damage not only to the base members but also the outer case. Each section of the outer case is a member of a matched set, therefore; damage beyond allowable limits to only one-half of the outer case assembly constitutes replacement of the entire assembly.

The purpose of this invention is to provide a means and method for the easy independent removal of base members from a slotted channel in an engine case while minimizing the possibility of damage of the segments and/or engine case during removal. This system not only speeds up the repair process it dramatically reduces the cost of the replacement parts.

SUMMARY OF THE PRESENT INVENTION

In practicing the present invention, an apparatus is provided which fixes a component case member in a relatively immobile position. Next, tool is positioned relative to the central axis of the case member so that a torque shaft on the tool is aligned with the central axis of the component case member. An arm extends along an axis peripendicular to the axis of the torque shaft. At the distal end of the arm are finer elements which extend perpendicular to the arm. The length of the arm from the torque shaft and the finger elements are constructed and arranged to interfit selectively between the blade elements on a base element in a slotted channel. Preferably, the fingers engage the roots of the blade elements at their juncture with the segment base. When a torque force is applied to the torque shaft, the finger elements bear equally upon each of the blade elements of a segment and the applied force slides the segments from the containing slotted channel.

In the method of the present invention, the case is immobilized. On a segment, a force is applied to the base of each stator blade on a segment along an arcuate path until the segment is removed from the case.

DESCRIPTION OF THE INVENTION

Figure 1:
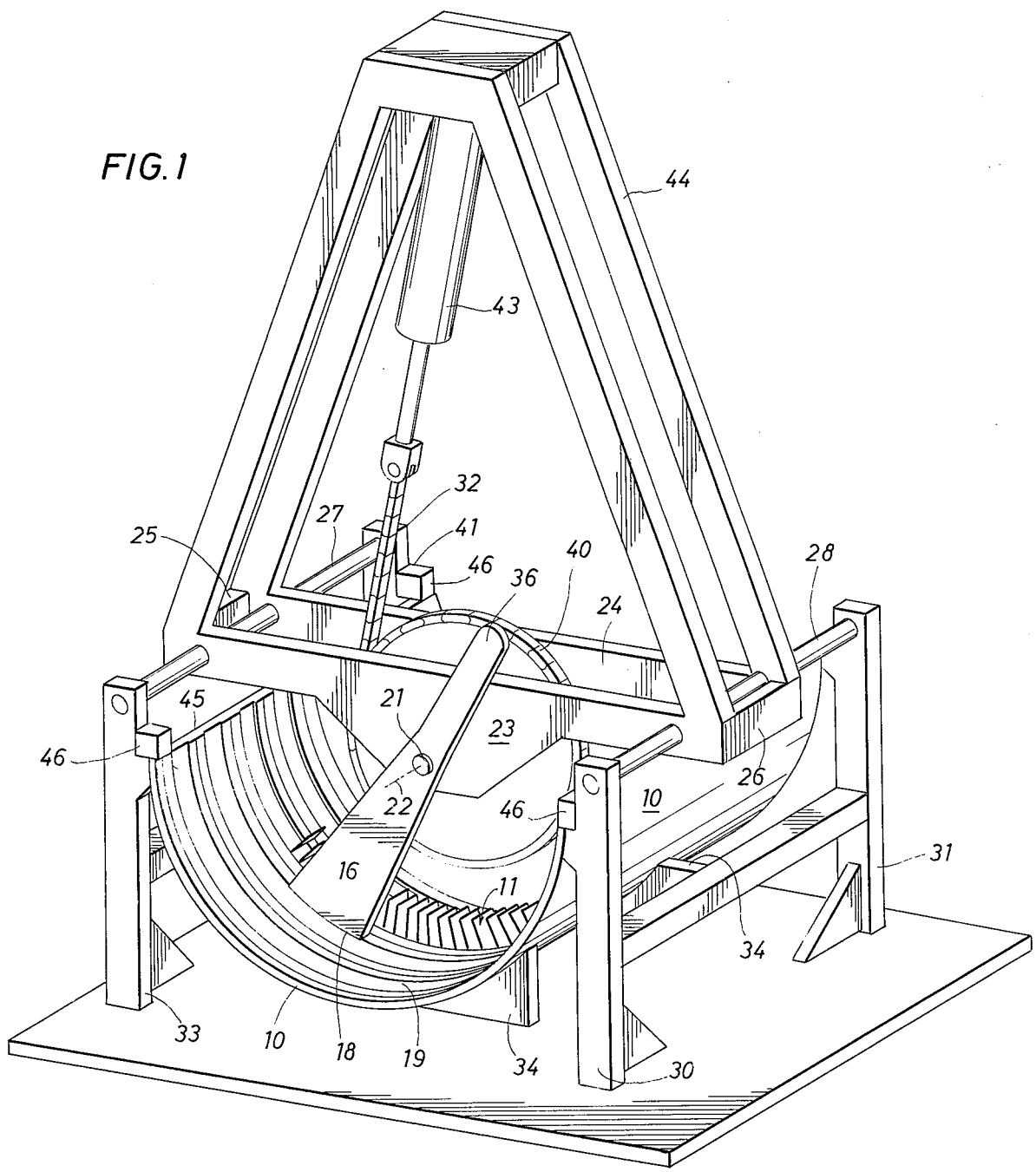
FIG. 1 is a perspective view of apparatus emboding the present invention.
Figure 2:
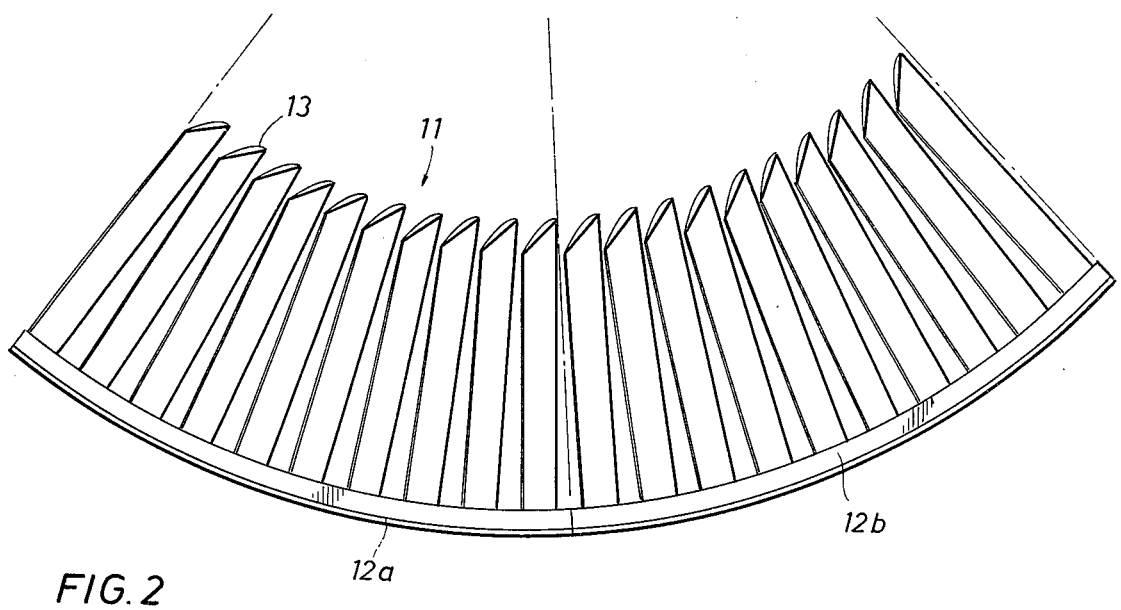
FIG. 2 is a view of side-by-side arranged segments.

Referring now to FIG. 1, the overall system is illustrated in perspective. A semi-cylindrical, compressor shell case 10 (one-half of an outer casing) is shown with only one row of stators 11 for illustration purposes. As shon in FIG. 2, the row of stators 11 is comprised of a number of arcuately shaped segments 12a, 12b (only two shown). On each base member 12a, 12b are a plurality of blade elements 13. Each blade element 13 is suitably attached to a segment 12a and extends along a radii toward a central axis of the outer casing. The segment 12a has a generally rectangular configuration (in cross-section) formed by a thin wall which slidably and snugly fitted into an inverted "T" shaped slot 14 (See FIG. 4) so that a blade element extends through the slot opening toward the central axis of the case 10. The thin wall generally is horizontal across the opening of the slot and has a short vertical section joining an outwardly extending rib portion. It will be obvious that, with a large number of segments 12a, 12b in a case, they would be extremely difficult to move as a unit. Also, after use, the segments can easily become seized or "stuck" in the case.

In the present invention, removal of each of the segments is accomplished by use of fingers 15 attached to an arm 16. As shown in the drawings, the arm 16 lies in a vertical plane and the fingers 15 project generally perpendicular to the plane of the arm 16. The bottom surfaces 17 of the fingers are co-extensive with an arcuate plane 18 (See FIG. 1) which is co-planar with the inner surface 19 of the outer casing 10. This is accomplished by sizing the length of the arm 16 to locate the fingers between the blade elements of a segment with the surfaces 17 of the fingers 15 disposed as close as possible to the inner surface 19 of the case. Hence, the fingers 15 are disposed as close as possible to the roots of the segment 12a.

Figure 3:
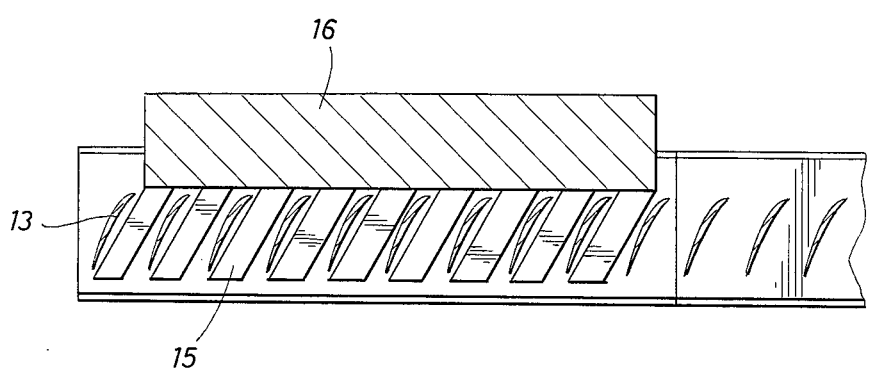
FIG. 3 is a plan view illustrating the interfitting relationship of the finger elements on an arm and a segment.
Figure 4:
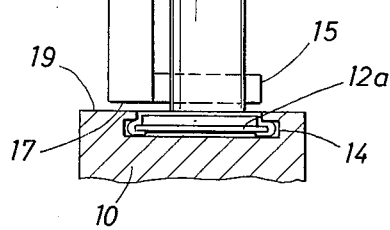
FIG. 4 is a view in a side cross-section to illustrate the relationship of the finger elements, a segment and a case member.

The blade elements 13, typically, are disposed at an angle with respect to a longitudinal axis of the casing 10 and the fingers 15 are pitched at a complementary angle to provide a surface-to-surface contact between each finger and each blade element. The length of the fingers 15 is such that they extend across the entire surface of a blade element as shown in FIGS. 3 and 4. It will be appreciated from FIG. 3 that an arcuately directed force can be applied to the base of each blade element by the fingers 15.

Turning now to FIG. 1, the vertical arm 16 is connected to a torque shaft 21 which is mounted for rotation about an axis 22. The shaft 21 is mounted in parallel plate members 23, 24 which have end plate members 25, 26 and the plate members generally define a rectangular frame. The rectangular frame is slidably supported by parallel shafts 27, 28 which extend through bushings (not shown) on the plate members 23, 24. The shafts 27, 28 are mounted on upright or vertical base members 30–33 so that the rectangular frame is suspended above the floor. The base members 30–33 are suitably constructed and arranged to receive a compressor casing shell 10 and spaced apart floor base members 34 are provided for central support of a case 10. The rectangular frame mounts the torque shaft 21 so that its axis 22 is coincidental to the axis for the cylindrically shaped casing 10. In this arrangement, the end surface 18 of the arm 16 is spaced co-planarly from the inner surface 19 of the casing 10. Extending in a diametrically opposite direction from the torque arm 16 is another arm extension 36. It will be appreciated that any force applied to the extreme end of the arm 36 will be transmitted to the fingers 15 on the end of the arm 16. A force can be applied to arm 36 by any suitable means.

To provide a constant force to the arm 16, a sprocket 40 can be attached to the torque shaft 21 between the plate members 23, 24. A chain 41 attached to a hydraulic force means 43 transmits constant pressure from the force means 43 to the sprocket and to the arm 16. The hydraulic actuator 43 is attached to a superstructure 44 which, in turn, is attached to the rectangular frame. The actuator 43 can be actuated in any suitable manner.

In the practice of the present invention, the shell case is fixed in position on the floor base members 34 and the side edges 45 of the case are fixed in position by latch blocks 46 so that the sides edges generally lie in a horizontal plane. In this position, the apparatus aligns the axis 22 of the torque shaft 21 with the axis of the case 10. To remove the segments, the rectangular frame is shifted along shafts 27 and 28 to interfit the fingers 15 on the arm 16 in the blade elements of the segment nearest to an open side edge 45 of the case. The fingers 15 interfit with the blade members in a segment so that upon the application of a torque force on the arm 16, the fingers 15 apply substantially uniform pressure to the blade members. The pressure is increased by the hydraulic actuator 43 and/or additional force can be applied to arm 36 to remove a segment. Upon removal of a segment, the frame and fingers are repositioned to engage the blade members of the next adjacent segment. The base members are removed from the case in a sequential fashion as described above.

When it is desired to replace the segments, the process is reversed and the fingers 15 are used to slide the segment 11 to its location within the case member. As will be appreciated the ability to independently act on each segment 11 facilitates the relocation of base elements 12 in a proper location in a case.

While the apparatus is not illustrated for a rotor it will be appreciated that in this instance the fingers would be external to the rotor and would otherwise act in the same manner as described with respect to a case.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

I claim:

1. A tool for installing and removing arcuately shaped segments relative to the concave surface of a semi-cylindrically configured case component wherein said segments comprise a plurality of blade elements respectively disposed along radii extending inwardly toward a central axis of said case component and wherein said segments are slidably interfittable in a plurality of parallel circumferential "T" slots within the concave surface of said case component such that said blade elements extend inward through the openings of said "T" slots, said tool including:
    a base member;
    retaining means on said base member for releasably securing said semi-cylindrical case component therein;
    frame means movably mounted on said base member for reciprocal motion along the central axis of said base member whereby it may be positioned in selective alignment with each of said "T" slots;
    a torque shaft mounted on said frame means in coaxial alignment with said central axis of said case component;
    a torque arm pivoted on and extending radially outward from said torque axis; and
    finger means on the outward end of said torque arm for interfitting with said blade elements on said segments by moving said frame means along said base member such that said torque arm is selectively positionable adjacent each of said segments in each of said "T" slots, said finger means interfitted with said blade elements by slight further additional movement of said frame and said torque arm to effect the desired intermeshed relationship, whereby application of torque to said torque shaft will apply a relatively uniform force to each of said blade elements of said segments within any of said parallel circumferential "T" slots in said case component in accomplishment the installation or removal of said segments.

2. The apparatus as defined in claim 1 wherein said base member included shaft means parallel to said central axis for providing slidable support for said frame means.

3. The apparatus as defined in claim 1 wherein said base member includes floor means and vertical base member means mounted upright from said floor member arranged for centrally supporting said case component and providing slidable support for said frame means.

4. The apparatus as defined in claim 1 wherein the spacing between said finger elements matches the spacing between said blade elements for applying a substantially uniform force to said blade elements.

5. The apparatus as defined in claim 4 wherein the bottom surfaces of the finger elements are arranged to engage the blade elements near their juncture with the segment.

6. The apparatus as defined in claim 5 wherein the finger elements extend across the entire bottom surface of the blade elements.

* * * * *